Patented Oct. 25, 1949

2,485,677

UNITED STATES PATENT OFFICE 2,485,677

COPOLYMERS OF ALKENYL DIESTERS OF ALKENYLPHOSPHONIC ACIDS WITH VINYL ACETATE

Arthur Dock Fon Toy, Chicago, Ill., assignor to Victor Chemical Works, a corporation of Illinois No Drawing. Application April 24, 1946, Serial No. 664,716

10 Claims. (Cl. 260—85.7)

This invention relates to copolymers of alkenyl diesters of alkenylphosphonic acids with vinyl acetate.

This application is a continuation in part of my co-pending application, Serial No. 625,460, filed October 29, 1945, now Patent No. 2,425,766. That application describes a process for producing monomeric beta, gamma alkenyl diesters of either alkyl or phenyl substituted ethenylphosphonic acids. That process comprises reacting beta, gamma unsaturated alcohols with alpha, beta unsaturated alkenyl phosphorus oxydichlorides in the presence of pyridine and then separating the resulting ester from the reaction mass. These esters are liquids which exhibit little or no tendency to polymerize under ordinary conditions. I have found that they are compatible with vinyl acetate in all proportions and that the mixtures may be polymerized under suitable heating conditions and with suitable catalysts. Liquid polymers may readily be produced, but it becomes more difficult to produce solid polymers as the number of carbon atoms in the alkenyl group increases. For example, the butenylphosphonates can be readily copolymerized with vinyl acetate to form strong solid resins, whereas with iso-octenyl and styrylphosphonates, liquid products are produced except under extreme conditions. For example, diallyl styrylphosphonate and vinyl acetate when heated at 70° C. for 20 hours in the presence of approximately 2% benzoyl peroxide forms only a partially polymerized liquid whereas when heated for 20 days it polymerizes to form a solid resin of artgum-like character.

The physical properties of the polymeric compositions may vary form viscous liquids to solid resins. The liquid products are useful as plasticizers for a variety of commercial resins and impart an appreciable flame-resistant character to such resins. The solid polymeric compositions may be used in glass laminates and in the production of clear solid articles.

The properties of the polymeric compositions may be controlled by varying the proportions of starting monomers, by varying the amount of polymerization catalyst employed, as well as the polymerizing temperature and time of heating.

In general, the copolymers herein described are produced by mixing the liquid monomeric esters in the desired proportions and dissolving therein a small amount of the polymerization catalyst, and heating the mixture at a temperature below that which will cause the decomposition of the starting ester. The temperature and period of heating will depend on the amount and type of catalyst employed and the degree of polymerization desired.

The following table shows a number of typical examples of the polymers of the present invention:

| Phosphonate Ester | Per cent by Volume | Vinyl Acetate Monomer | Per cent by Volume | Benzoyl Peroxide Catalyst (g/10 cc. of monomers) | Polymerization Temperature, °C | Period of Heating, hours | Properties of Polymer Products |
|---|---|---|---|---|---|---|---|
| None | 0 | " | 100 | 0.01 | 70–73 | 15.5 | Soft rubbery solid. |
| Diallyl isobutenylphosphonate | 30 | " | 70 | 0.10 | 70 | 16.5 | Water-white, sl. soft solid. |
|  |  |  |  |  |  | 36.5 | Water-white, hard, strong solid. |
|  | 50 | " | 50 | 0.20 | 70 | 16.5 | Water-white, sl. soft solid. |
|  |  |  |  |  |  | 37.5 | Light yellow, hard, strong solid. |
|  | 10 | " | 90 | 0.01 | 70 | 20.0 | Water-white, artgum-like solid. |
|  |  |  |  |  |  | (20 days) | Amber-colored, clear, hard, strong solid. |
|  | 70 | " | 30 | 0.50 | 70 | 20.0 | Greenish yellow, hard, strong solid. |
|  | 10 | " | 90 | 0.01 | 70 | 20.0 | Clear, soft, artgum-like solid. |
|  |  |  |  |  |  | (20 days) | Water-white, very hard, strong solid. |
| Dimethallyl isobutenylphosphonate | 30 | " | 70 | 0.10 | 70 | 16.5 | Water-white, sl. soft solid. |
|  |  |  |  |  |  | 37.5 | Water-white, hard, strong solid. |
|  | 50 | " | 50 | 0.20 | 70 | 16.5 | Sl. yellow, clear, hard, strong solid. |
|  | 70 | " | 30 | 0.50 | 70 | 20.0 | Greenish yellow, hard, strong solid. |
|  | 10 | " | 90 | 0.01 | 70 | 20.0 | Very viscous liquid. |
|  |  |  |  |  |  | (20 days) | Ft. straw-colored, artgum-like solid. |
| Dimethallyl iso-octenylphosphonate | 30 | " | 70 | 0.10 | 70 | 16.5 | Viscous liquid. |
|  |  |  |  |  | 80 | +18.5 | Soft, artgum-like solid. |
|  | 50 | " | 50 | 0.20 | 70 | 16.5 | Viscous liquid. |
|  |  |  |  |  | 80 | +18.5 | Very soft, artgum-like solid. |
|  | 30 | " | 70 | 0.50 | 70 | 20.0 | Clear, viscous liquid. |
|  |  |  |  |  |  | (20 days) | Greenish, clear, artgum-like solid. |
| Diallyl styrylphosphonate | 10 | " | 90 | 0.01 | 70 | 20.0 | Clear liquid. |
|  | 50 | " | 50 | 0.20 | 70 | 20.0 | Do. |
|  |  |  |  |  |  | (20 days) | Ft. straw-colored, artgum-like solid. |
|  | 30 | " | 70 | 0.10 | 70 | 20.0 | Water-white liquid. |

In another example the following mixture was prepared:

| | | |
|---|---|---|
| Vinyl acetate | cc | 5.0 |
| Diallyl isobutenylphosphonate | cc | 2.5 |
| Diallyl phenylphosphonate | cc | 2.5 |
| Benzoyl peroxide | g | 0.2 |

This liquid mixture was heated at 70° C. for 24 hours to produce a clear, water-white, hard and tough resin product.

All of the copolymers in the above examples show definite flame-resistance when compared to the resins obtained by polymerization of vinyl acetate alone.

The solid copolymers obtained when utilizing the lower alkenylphosphonates such as the isobutenylphosphonates shown in the above table are of the thermosetting type and are insoluble in water and the ordinary organic solvents such as alcohol, benzene, butyl acetate, acetone, carbon tetrachloride, etc. Cast solid articles may be made from such copolymers by confining the mixed monomers or partially polymerized mixtures with suitable catalysts, in molds of suitable shape and heating to cause polymerization to the solid state.

Since the rate of polymerization slows down as the size of the alkenyl group increases, it is preferred that the alkenyl group be limited to one containing not over 8 carbon atoms. Those containing 8 carbon atoms such as the octenyl and styrylphosphonates are polymerized to artgum-like solids only under conditions of higher temperatures or long periods of heating.

The preferred temperature for the polymerization reaction is 70 to 80° C., though higher temperatures are permissible under certain conditions such as in the final stages of the reaction or where the reaction is conducted under pressure, or so long as decomposition of the monomeric components is avoided. Temperatures as low as 60° C. may be employed satisfactorily where the mixture contains a high proportion of vinyl acetate.

The foregoing detailed description is given for clearness of understanding only, and no unnecessary limitations should be understood therefrom, for some modifications will be obvious to those skilled in the art.

I claim:

1. A copolymer obtained by copolymerizing 30 to 90% by volume of vinyl acetate and 70 to 10% by volume diallyl isobutenylphosphonate.

2. A copolymer obtained by copolymerizing 30 to 90% by volume of vinyl acetate and 70 to 10% by volume of dimethallyl isobutenylphosphonate.

3. A copolymer obtained by copolymerizing 30 to 90% by volume of vinyl acetate and 70 to 10% by volume of dimethallyl iso-octenylphosphonate.

4. A copolymer obtained by copolymerizing 30 to 90% by volume of vinyl acetate and 70 to 10% by volume of a beta, gamma alkenyl diester of isobutenylphosphonic acid.

5. A copolymer obtained by copolymerizing 30 to 90% by volume of vinyl acetate and 70 to 10% by volume of a beta, gamma alkenyl diester of iso-octenylphosphonic acid.

6. The method as set forth in claim 9, in which the polymerization catalyst is benzoyl peroxide.

7. A copolymer obtained by copolymerizing 30 to 90% by volume of vinyl acetate and 70 to 10% by volume of a beta, gamma alkenyl diester of an alkenylphosphonic acid selected from the class consisting of alkyl and phenyl substituted ethenylphosphonic acids.

8. A copolymer obtained by copolymerizing 30 to 90% by volume of vinyl acetate and 70 to 10% by volume of a beta, gamma alkenyl diester of an alkenylphosphonic acid selected from the class consisting of alkyl and phenyl substituted ethenylphosphonic acids in the presence of an organic peroxide polymerization catalyst at a temperature above 60° C. but below a temperature at which the starting materials begin to decompose for a period of time sufficient to increase the viscosity of the mixture.

9. The method which comprises reacting 30 to 90% by volume of vinyl acetate with 70 to 10% by volume of a beta, gamma alkenyl diester of an alkenylphosphonic acid selected from the class consisting of alkyl and phenyl substituted ethenylphosphonic acids in the presence of an organic peroxide polymerization catalyst at a temperature of about 60 to 80° C. for a period of time sufficient to increase the viscosity of the mixture.

10. The method which comprises reacting 30 to 90% by volume of vinyl acetate with 70 to 10% by volume of a beta, gamma alkenyl diester of isobutenylphosphonic acid in the presence of an organic peroxide polymerization catalyst at a temperature of about 60 to 80° C. for a period of time sufficient to give a solid resin product.

ARTHUR DOCK FON TOY.

No references cited.